United States Patent
Millar

(10) Patent No.: US 10,274,035 B2
(45) Date of Patent: Apr. 30, 2019

(54) PADDED INJURY REDUCING NON SLIP POOL DECKING

(76) Inventor: David J. Millar, St. Charles, MO (US)

(*) Notice: Subject to any disclaimer, the term of this patent is extended or adjusted under 35 U.S.C. 154(b) by 1166 days.

(21) Appl. No.: 13/523,973

(22) Filed: Jun. 15, 2012

(65) Prior Publication Data

US 2012/0321880 A1 Dec. 20, 2012

(51) Int. Cl.
*F16F 1/37* (2006.01)
*E04H 4/14* (2006.01)
*E04F 15/02* (2006.01)
*E04F 15/10* (2006.01)

(52) U.S. Cl.
CPC .......... *F16F 1/37* (2013.01); *E04F 15/02138* (2013.01); *E04F 15/02172* (2013.01); *E04F 15/02183* (2013.01); *E04F 15/105* (2013.01); *E04F 15/107* (2013.01); *E04H 4/14* (2013.01); *E04F 2290/044* (2013.01); *F16F 2224/0225* (2013.01); *Y10T 428/249991* (2015.04)

(58) Field of Classification Search
None
See application file for complete search history.

(56) References Cited

U.S. PATENT DOCUMENTS

| | | | | |
|---|---|---|---|---|
| 5,599,617 A | * | 2/1997 | Ewald | 428/317.3 |
| 5,750,246 A | * | 5/1998 | Yuasa et al. | 428/318.4 |
| 2003/0003293 A1 | * | 1/2003 | Ramesh | 428/319.3 |
| 2004/0138374 A1 | * | 7/2004 | Thenault | C08J 7/047 524/589 |
| 2005/0136219 A1 | * | 6/2005 | Guenter et al. | 428/141 |
| 2005/0170221 A1 | * | 8/2005 | Kim | A41D 31/0061 428/53 |
| 2007/0020433 A1 | * | 1/2007 | Gruenbacher | A47L 23/266 428/137 |
| 2007/0271704 A1 | * | 11/2007 | Breeland | 5/653 |
| 2010/0043309 A1 | * | 2/2010 | Martin et al. | 52/79.5 |

* cited by examiner

*Primary Examiner* — Chinessa T. Golden
(74) *Attorney, Agent, or Firm* — Charles McCloskey

(57) ABSTRACT

A padded injury reducing non slip pool decking has an expanded polypropylene substrate as a core with its surfaces and a coating upon the surfaces adhered following skiving upon the surfaces. The present invention seeks to reduce slip injuries around a pool by providing a padded surface. The padded surface attenuates impact forces that occur when a person falls, or a body part of a person, hits the deck. The present invention provides a cushioning action that has increased energy absorption properties over the existing surfaces around swimming pools. The core utilizes expanded polypropylene melted from its pellet stage into generally slab form with a polyurethane coating. The coating has a precise mixture of three components and various additives. The components include methylenebis and isothianzolin and the additives include traction, tints, among other things.

5 Claims, 4 Drawing Sheets

PADDED INJURY REDUCING NON SLIP POOL DECKING

CROSS-REFERENCE TO RELATED APPLICATION

This non-provisional application claims priority to the provisional application 61/498,300 filed on Jun. 17, 2011 which is owned by the same inventor.

BACKGROUND OF THE INVENTION

The padded injury reducing non slip pool decking generally relates to impact attenuating materials for slip and fall injury reduction. More specifically, it relates to decking that absorbs impact forces from human limbs and heads thrown into the decking. The decking of the invention, such as pads around swimming pools, reduces blunt force trauma injuries. The decking has a slip resistant surface that also resists microbial degradation in the presence of water: freshwater, chlorinated water, and saltwater.

For millennia, people have gone swimming in a variety of water bodies: streams, creeks, rivers, beaches, ponds, lakes, and oceans. People just like water and have a hard time resisting its attraction. Those water bodies have their typical natural surroundings which can be soft or hard, sandy or rocky, cold, warm, or hot. Swimmers understand the risks in swimming in natural water bodies.

As populations in cities increased over the last century, more people lived away from natural water bodies. In overcrowded cities of the early 20$^{th}$ century, city leaders and landowners foresaw the need for artificial swimming places: municipal and private swimming pools of all description. Seeking to keep construction costs low and retain the water in the pool, owners used primarily concrete to construct swimming pools.

During construction, a contractor excavates the earth to reveal a volume for the eventual swimming water. The contractor then builds the pool by placing concrete upon the surface of the excavation, or later lining the excavation with various membranes. The contractor also places appropriate water supply and water removal plumbing into the pool construction as per the plans and specification of the architect. With the pool volume prepared in the excavation, the contractor then places a deck adjacent to the pool excavation and generally parallel to the desired water surface in the pool. The deck may be slightly higher than the water surface. Preferably the deck is of concrete to serve as a pavement resistant to the water, chlorine, and sunlight present at a swimming pool. The concrete deck also limits seepage of water into the ground beneath and around the pool. Concrete retains its inherent hardness.

DESCRIPTION OF THE PRIOR ART

Over the years, lifeguards and staff have cautioned swimmers and visitors to a pool to avoid running upon the pool deck. Many have heard the lifeguard's whistle, received the warning, and then walked calmly upon the concrete pool deck. However some do not heed the warning and succumb to an injury from a slip or a fall upon the concrete pool deck. Pool staff members also incur injuries from time to time. The Applicant is aware of two such injuries. One injury afflicted a lifeguard during the line of duty as the lifeguard attempted to rescue a child swimmer during a summer camp.

The prior art decks, being of concrete, have little forgiveness for those who fall upon them. Various woods and select polymers have appeared alongside pools. It time though, those materials wear to a smooth surface that raises the probability of a slip or a fall upon them. Some decks have wood or polymer members spaced apart with gaps in a pattern between the members.

The gaps allow for drainage of water upon the members however, the gaps present additional edges that grasp the toes or the feet of swimmers or visitors. These edges lead to continued slips and falls.

The present invention overcomes the disadvantages of the prior art and provides a padded injury reducing non slip pool decking that attenuates the impact forces upon a limb or other part of a person during a slip or a fall as the person abruptly approaches a deck. The present invention also resists decay from ultraviolet light, bacteria, microbes, water, and impact forces. The present invention accomplishes the goals of a decking that attenuates impact forces while resisting decay from the elements.

SUMMARY OF THE INVENTION

Generally, the padded injury reducing non slip pool decking has an expanded polypropylene substrate as a core, the core has various surfaces, and a coating adheres upon the surfaces using skiving upon the surfaces of the core. Currently, most swimming pools have a deck that surrounds them by concrete or other hard, durable material. The present invention seeks to reduce slip and fall injuries upon the pool deck by providing a padded surface around pools or other wet areas. The padded surface attenuates impact forces that occur when a person falls, or a body part of a person, and hits the deck. The present invention provides a cushioning action that has increased energy absorption properties over the existing surfaces around swimming pools.

The decking of the invention includes a plurality of replacement pads for positioning around a pool area, preferably near lifeguard stands, ladders to diving boards, wading entrances to pools, and other sites known for falls. The decking of the invention includes a single or a dual density closed cell energy absorbing expanded polypropylene foam pads, or "EPP" foam pads, a polyurethane coating providing an anti-fungal nonslip surface, and releasable fasteners, such as hook and loop fastener material, for cooperatively engaging like fasteners mounted to an existing pool deck. The pads of the invention are suitable for cutting or molding into various sizes to fit an intended application or location. The invention's pads may be of single piece construction or multiple sections. The invention's pads are also suitable for molding or forming to appear as stone or tile with coloration that resembles those materials. And the pads of the invention may come in various thicknesses to provide the proper level of cushioning in higher risk areas, such as near diving boards.

The Applicant has considered expanded polyethylene, or EPE, and expanded polypropylene, or EPP, as suitable materials to attenuate impact and withstand the elements and biological decay. During testing, the EPP exhibited difficulties with cost and lack of ability to support adhesion upon its surface. The Applicant has solved the lack of adhesion through this invention. The Applicant has removed the low coefficient of friction skin formed upon the surface of an EPP object during its manufacture. The manufacturing of a piece molds and expands polypropylene beads, or pellets, into a piece. However the surface of the piece develops a skin with a smooth exterior because the beads melt and acquire the surface characteristics of the mold, generally smooth. The present invention has skived the surface of a piece and thus exposed approximately 50% of the crystalline structure of individual cells of polypropylene in the piece. Skiving shaves, or imparts, cuts to the surface of the piece making that exposure of the cells. With this cell exposure, the Applicant found a coating that replaces the skin of a piece yet allows for other items to adhere, or bond to, the coating applied upon a piece.

There has thus been outlined, rather broadly, the more important features of the invention in order that the detailed description thereof that follows may be better understood and that the present contribution to the art may be better appreciated. The present invention also includes coating additives for coloration, grip, and microbial resistance, variations in EPP density, and elongation of the coating during an impact event. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a padded injury reducing non slip pool decking that decreases impact forces upon a person or part of a person by upwardly of 67% from a fall upon the decking.

Another object is to provide such a padded injury reducing non slip pool decking that resists degradation from water, chlorine, ultraviolet light, bacteria, microbes, fungi, and saltwater.

Another object is to provide such a padded injury reducing non slip pool decking that attaches to existing pool decks.

Another object is to provide such a padded injury reducing non slip pool decking that can be easily and readily installed by lifeguards, pool staff members, and unskilled labor.

Another object is to provide such a padded injury reducing non slip pool decking that can be easily and efficiently manufactured and marketed to the consuming public.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

The present art overcomes the prior art limitations by providing padded injury reducing non slip pool decking. The invention will be better understood from a reading of the following detailed description of the preferred embodiment and alternate embodiments of the invention in conjunction with the figures in which the sizes and distances between various elements does not represent actual sizes or distances between various elements.

Figure 1:
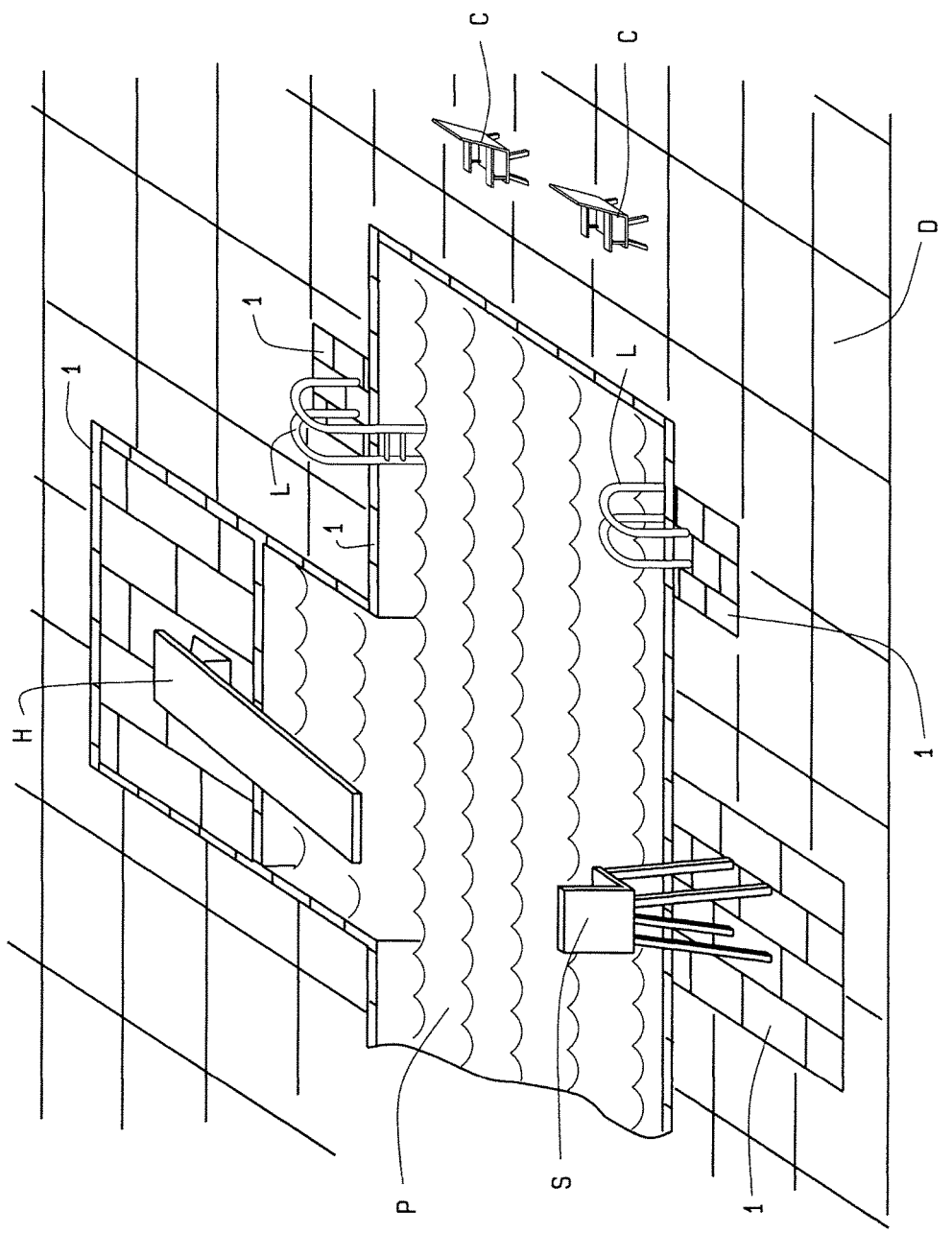
FIG. 1 illustrates a typical swimming pool with the invention deployed around it.

The Applicant foresees usage of the pads of the invention around swimming pool areas to provide protection to lifeguards, pool staff, and pool visitors against blunt force trauma injuries that result from slips and falls. FIG. 1 shows a typical swimming pool, as at P, with its lanes for lap swimming, scuppers around the pool, and deck, as at D, outwardly from the scuppers. Appurtenant to the deck, the pool has a high diving board H, various ladders L at the edge of the water, and elevated lifeguard stands as at S. Further outwardly from the deck, the pool includes various chairs as at C. Unfortunately, the existing concrete areas, such as decks, or aprons, as at D, around swimming pools do not provide any cushioning to prevent blunt force trauma injuries. The present invention seeks a remedy to that.

The Applicant has developed a system of connecting pads, as at 1, for use around swimming pools, tubs and showers, and other water features that results in reducing slip and fall injuries, primarily head injuries to people. The invention may have critical usage near lifeguard stands, diving board ladders, and ladders into a pool, the areas prone to slip and fall injuries as shown in FIG. 1. The invention utilizes interconnecting pads that follow the contours a pool deck while reducing the blunt force trauma transmitted to a person or part of a person, such as the head. The pads have a generally rectangular shape that allows for installation with an offset. The pads of the invention also provide for ready installation, efficient cleaning, and passage of water beside them for drainage. The invention's pads may also see use in other areas for management of impact energy.

Figure 2:
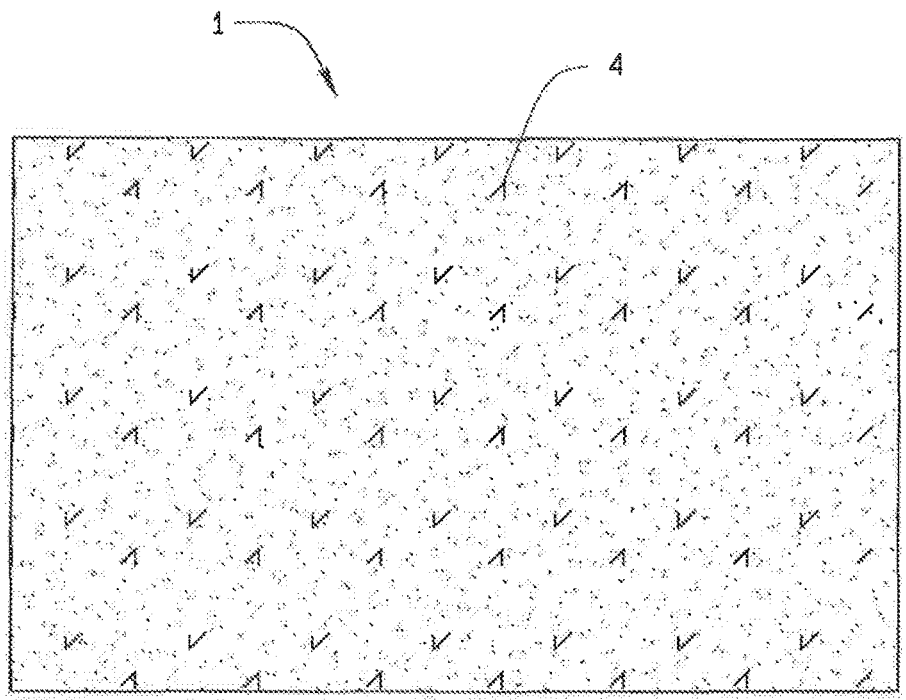
FIG. 2 shows a top view of a rectangular pad.
Figure 3:
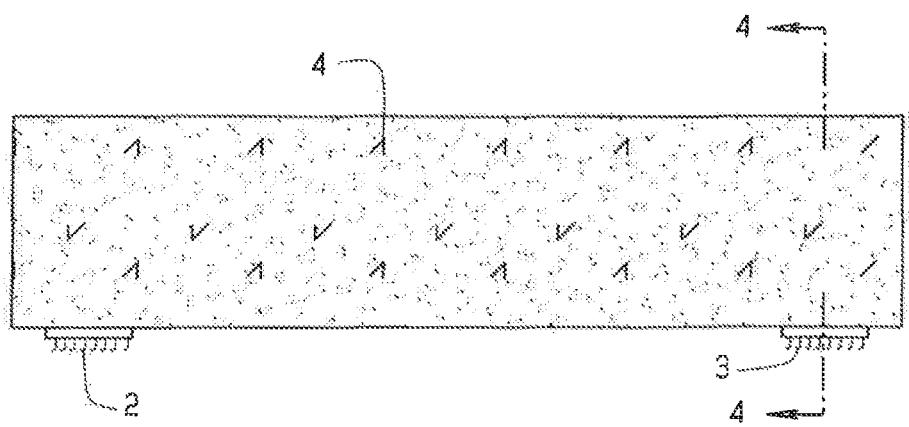
FIG. 3 shows a side view of a rectangular pad.
Figure 4:
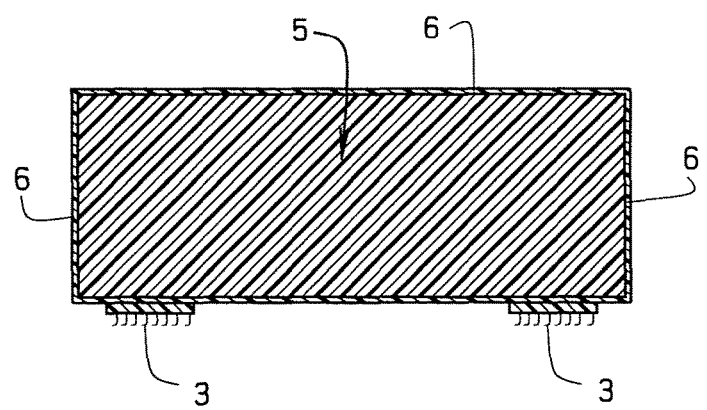
FIG. 4 illustrates a section view of a pad.
Figure 5:
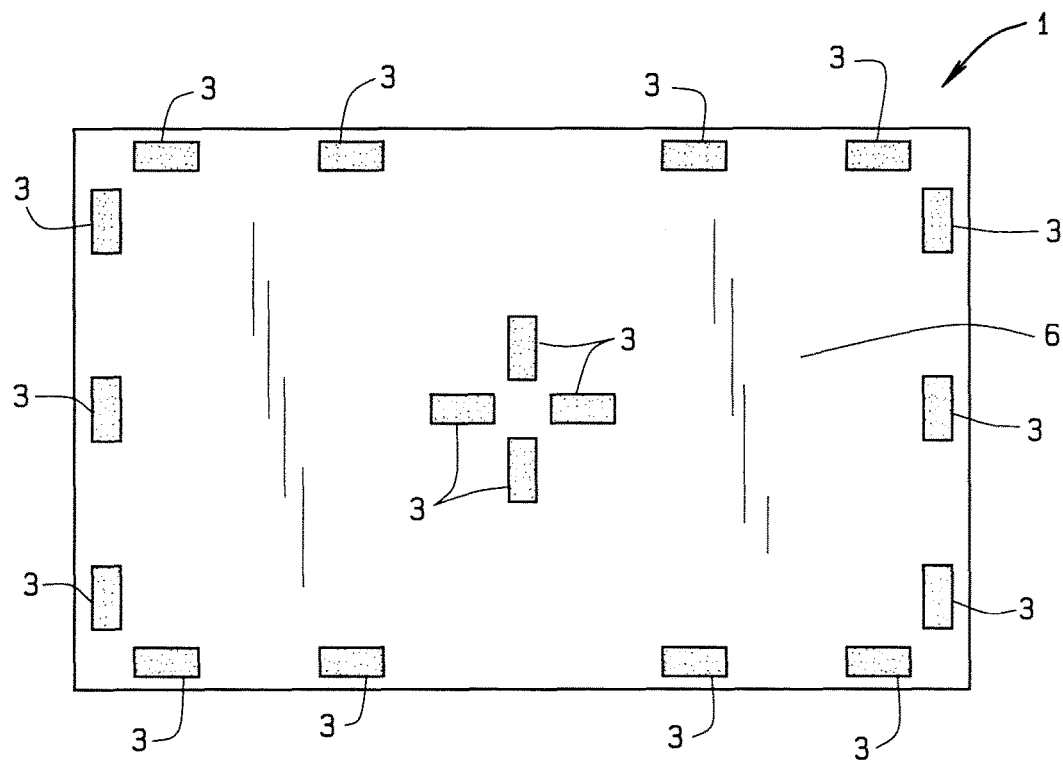
FIG. 5 provides a bottom view of a pad showing the location of the releasable fasteners.

FIGS. 2, 3 show a top view and a side view respectively of one pad 1 of the present invention. The pads utilize foam with properties tailored towards impact attenuation. The foam in the invention's pads has a density in the range of about 20 g/l to about 200 g/l, and specific cell structure, recovery rate, and stiffness that dissipate the energy of an impact upon the pad. The invention's pads utilize EPP foam preferably of single density or alternatively dual density. The pads then attach to the deck of a pool, or other water feature, utilizing cooperating hook and loop fasteners upon the pads and also upon the deck.

Each pad preferably has three primary components: a closed cell, high energy absorbing, impact absorbing foam 5, typically EPP; a polyurethane, anti-fungal, non slip coating; and, a plurality of releasable fasteners, such as hook 2 and loop 3, or alternatively adhesive. The pads generally carry the loop portion of the fasteners while the hook portion attaches to an existing pool deck using existing methods.

The coating 6 includes from about six to about nine components that allow a mechanical bond of the coating to the EPP substrate following skiving. The coating has the following properties: less than 3% shrinkage, tensile strength in excess of 2000 psi, an elongation of 300%, a high coefficient of friction from about 0.7 to about 1.3, a shore hardness in excess of 75 A, an operating temperature range of about −40° F. to about 210° F., and a lack of support for biological activity. The coating prevents warping of individual pieces and its elongation allows the coating and the substrate to attenuate impact forces during usage. The coating also permits inclusion of other components such as tinting agents, matting agents, traction additives 4, such as sand, vinyl flatteners, and fibers for cut resistance, particularly para-aramid synthetic fiber, such as poly-paraphenylene terephthalamide or Kevlar®, and additives that impart resistance to ultraviolet light. The traction additive, or agent, imparts to the coating a coefficient of friction from about 0.7 to about 1.30 that reduces or lessens impact injuries by reducing the probability of slips and falls upon the invention when installed. These other additives impart durability and slip resistance to a piece for various applications.

Preferably, the coating includes Scorpion X02-ZBG Biocidal Polyurethane made by Custom Concept Coatings of Belleville, Ontario, Canada. This polyurethane coating has three components shown in FIG. 7: part A, as at 20, part B, as at 21, and part C, as at 22. Part A has 1,1′-methylenebis (4-isocyanatocyclohexane), or $C_{15}H_{22}N_2O_2$, from Tokyo Chemical Industrial, Ltd. of Japan, and 2-n-Octyl-4-isothianzolin-3-one, or $C_{11}H_{19}NOS$, from Dalian Haoyuan Jinghua Science & Tech. Development Co., Ltd. of Yantai, China. Part B has proprietary miscellaneous zinc compounds and n-butyl acetate, or $C_6H_{12}O_2$, from Celanese Corp. of Oberhausen, Hoechst, Germany. Part C provides a catalyst containing at least one acrylic polymer, at least one residual monomer, and water. The preferred embodiment has these components mixed, as at 23, in ratios suitable to achieve the intended goals. The mixture has generally about 2 to about 3 parts A, about 0.5 to about 1.5 parts B, about 0.5 to about 1.5 parts C. For coloration and traction, the mixture includes about 1/8 to about 1/6 parts tint and about 1 part traction additive. The preferred embodiment of the coating for the invention has the exact proportions of 2.5 parts A, 1 part B, 1 part C, 1/7 parts tint, and 1 part traction additive. Preferably, the formulation of the invention follows these steps as later shown in FIG. 7: blending part B into to part A, then adding part C to the blend of part B and part A, and then adding various additives as desired into the blend of part C into part B and part A. The preceding general and precise, preferred and alternate, mixtures undergo mechanical mixing for about 1.5 minutes to about 3.5 minutes, preferably 3 minutes. The mixing preferably occurs from about 55° F. to about 100° F. at a relative humidity of 5 percentage points less than the air temperature. The mixtures may be applied as a coating upon the EPP core using a high volume, low pressure, or HVLP, spray gun, brush, roller, or trowel within 20 minutes.

As desired by the end user, the coating attains a gloss finish without any flattener, a semi-gloss finish with 0.5 parts flattener, and a matte finish with 1 part flattener. For enhanced durability, the mixture of the invention includes 1 part Kevlar fibers. Alternatively, construction of the invention may laminate Kevlar fabric upon the surface of the EPP core and integral with the coating.

Within the coating, the invention has its EPP core. EPP has various properties and a few suited for this invention. The Applicant has tested various formulations of EPP in pursuit of a proper strain rate and density for a decking application. Devices that seek to attenuate impact forces undergo testing according to ASTM F1292, Standard Specification for Impact Attenuation of Surfacing Materials within the Use Zone of Playground Equipment, incorporated by reference. The Standard determines whether a material attenuates impact forces. A material that meets the Standard has these properties: a Gmax less than 200, a HIC less than 1000, densities from about 1.9 to about 3.7 pcf, strain rates between about 0.1 to about 0.4 MPa. At these densities, the EPP material works well for applications in temperatures from about −22° F. to about 212° F. as decking material. For applications at colder temperatures, EPE has a density between about 2.3 to about 4.2 pcf, strain rates between about 0.1 to about 0.4 MPa, and an operating temperature range of about −76° F. to about 160° F. The coating, preferably select polyurethane, increased the operating temperature range an additional 20° F. to about 180° F.

The present invention with its EPP core and select polyurethane coating has provided the following impact testing results pursuant to F1292 as shown in Table 1:

TABLE 1

Testing EPP for ASTM F1292

| Name | Sample ID | Drop No. | Condition | Location | Anvil | Drop Height (cm) | Velocity (m/s) | Velocity (ft/s) | Energy (J) | Peak g acceleration | t@150 g | t@200 g | HIC |
|---|---|---|---|---|---|---|---|---|---|---|---|---|---|
| Amblock 1 | Foam block 1 1.4 inch | 1 | Ambient | Rear | Flat | 196.4 | 5.97 | 19.6 | 88.6 | 129.4 | 0 | 0 | 750 |
| Amblock 2 | Foam block 2 1.4 inch | 1 | Ambient Mean Stand. Dev. | Rear | Flat | 196.4 | 5.97 | 19.6 | 88.8 | 130.8 130.1 0.99 | 0 | 0 | 769 |
| rigid foam PPAD | 1.4 inch EPP sheet | 1 | Ambient | Rear | Flat | 200 | 6.07 | 19.9 | 91.8 | 132.7 | 0 | 0 | 785 |

Considering other applications of the invention, the Applicant took into account the weight of a hybrid three leg instrumented for crash testing, the bearing area of a boot sole upon a piece of the invention, and the impact velocity. The Applicant utilized a Shore hardness of 88 A in his calculations and also a 62 mil polyurethane coating with a tensile strength of 2300 psi that elongates up to 450%, and a 2.3 pcf EPP foam with a strain rate of 0.20 MPa. The coating also included a traction additive of EPDM crumb rubber, that is ethylene propylene diene monomer, that serves as a cushioning material and mitigating agent of kinetic energy from impacts. The Applicant achieved the results shown in Table 2 by maximizing the time between a floor accelerating and the floor striking a boot sole such as during a fall. The coating utilized for this testing has high flexibility, a thickness of about 0.062 inches, thus maximizing the core thickness.

TABLE 2

Testing Results

| | Tibia Load Peak Value (lbf) compression Low Impulse 8 m/s | | | | | Tibia Load Peak Value (lbf) compression High Impulse 14 m/s | | | | | Compression Strength |
| | Sample 1 | | Sample 2 | | Average | Sample 3 | | Sample 4 | | Average | |
| Sample Set | Left Leg | Right Leg | Left Leg | Right Leg | lbf | Left Leg | Right Leg | Left Leg | Right Leg | lbf | % |
| --- | --- | --- | --- | --- | --- | --- | --- | --- | --- | --- | --- |
| Floor | 1917 | 1918 | 1994 | 1982 | 1953 | | | 3034 | 3067 | 3051 | |
| 1-5 | 1017 | 1003 | 1038 | 995 | 1013 | 1320 | 1303 | 1340 | 1244 | 1302 | 7.5 |

Figure 6:
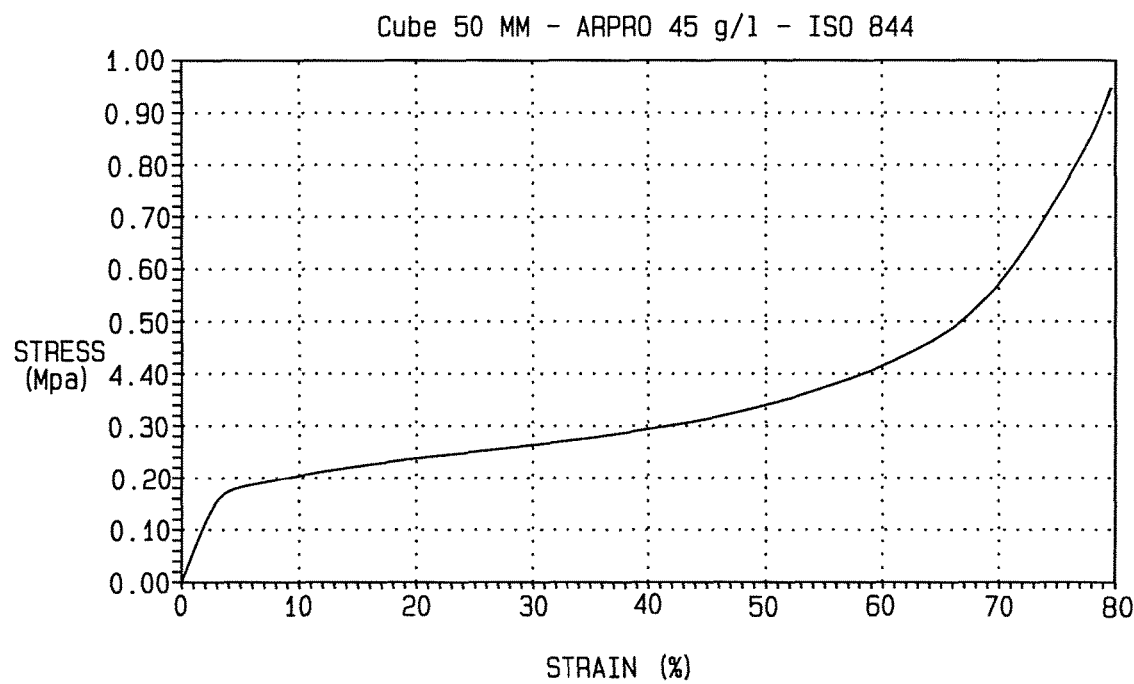
FIG. 6 shows a stress-strain graph for the substrate of the invention.

Additional testing of the invention showed further support for EPP as a preferred material for the decking that attenuates a slip or fall upon it. FIG. 6 provides a stress stain curve for EPP, here 2.3 pcf. The curve indicates that higher strain rates, 0.3 MPa and greater, perform better for decking in a point impact application and slightly lower strain rates, 0.2 MPa and lower perform better for decking applied in a planar impact. EPP decking with a 0.25 MPa strain rate performs well in dual point impact and planar impact applications.

Figure 7:
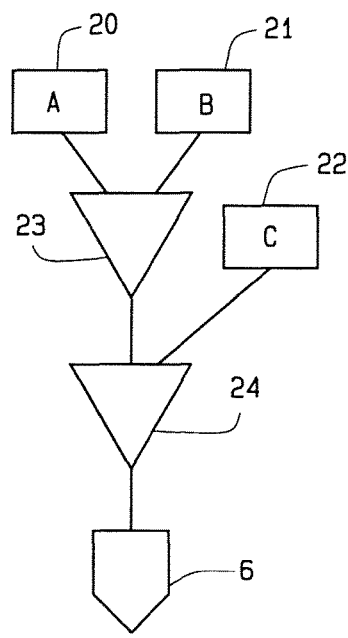
FIG. 7 shows the preferred sequence of mixing the components of the invention; and, FIG. 8 shows an alternate sequence of mixing the components of the invention.

FIG. 7 provides a flow chart for the steps in making the formulation of the coating for the invention. Preferably, the formulation of the invention follows these steps in its manufacture:

First, blending part B into to part A as at 23;

Second, adding part C to the blend of part B and part A as at 23a; and,

Third, adding various additives as desired into the blend of part C into part B and part A as at 6.

Figure 8:
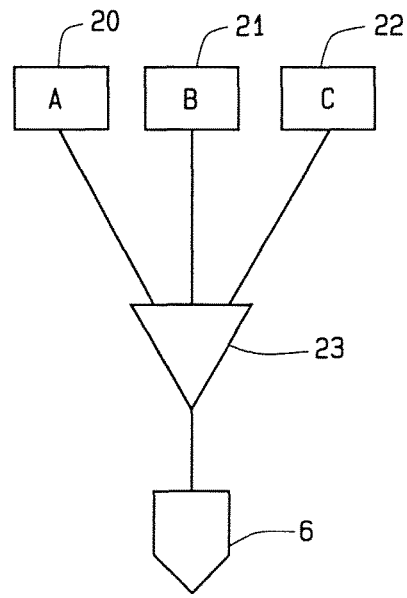

An alternative flow chart of steps to make the formulation of the coating appears in FIG. 8. Alternatively, the formulation of the invention follows these steps in its manufacture:

First, blending part C, part B, and part A simultaneously as at 23; and,

Second, adding various additives as desired into the blend of parts C, B, A as at 6.

From the aforementioned description, a padded injury reducing non slip pool decking has been described. The padded injury reducing non slip pool decking is uniquely capable of bonding a coating upon EPP using skiving so that the cooperating EPP and coating reduce forces upon a object impacting the decking by upwards of 67%. The padded injury reducing non slip pool decking and its various components may be manufactured from many materials, including but not limited to, polymers, nylon, polypropylene, polyvinyl chloride, high density polyethylene, ferrous and non-ferrous metals, their alloys, and composites. The preceding specification has described the preferred materials of the invention however, the Applicant notes that other materials may be substituted.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for reducing impact injuries, consisting of:
   a rigid planar core of a slab shape with at least one surface, said at least one surface being skived, said core being expanded polypropylene of a density of at least 3.1 pcf and with a strain of about 0.1 MPa to about 0.4 MPa; and,
   a coating upon said at least one surface, said coating having a coefficient of friction with human skin from about 1.01 to about 1.30 wherein said coating is adapted to reduce the risk of impact injuries, wherein said coating elongates proportionally to said core up to and including 450%; and, wherein said device has a Gmax less than 200 and a HIC less than 1000;

wherein said coating avoids bending.

2. A formulation that reduces impact injuries, consisting of:
   a rigid planar core of a slab shape having exterior surfaces; and,
   a coating upon said exterior surfaces, said coating including a Part A, a Part B, and, a Part C;
   wherein said core is expanded polypropylene;
   wherein Part A is 1,1'-methylenebis (4-isocyanatocyclohexane) and 2-n-Octyl-4-isothianzolin-3-one;
   wherein Part B is at least one zinc compound and n-butyl acetate;
   wherein Part C is a catalyst, said catalyst consisting of one of at least one acrylic polymer, at least one residual monomer, and water;
   2.5 parts Part A, 1 part Part B, and 1 part Part C;
   a traction additive imparting to said coating a coefficient of friction with human skin from about 1.01 to about 1.30; and,
   wherein said coating avoids bending.

3. The impact injury reducing formulation of claim 2 wherein Part B is one of a matting agent and anti-cut fibers.

4. A device for reducing impact injuries, consisting of:
   a rigid planar core of a slab shape with at least one surface, said at least one surface being skived, said core being expanded polypropylene of a density of at least 3.1 pcf and with a strain of about 0.1 MPa to about 0.4 MPa;
   a coating upon said at least one surface, said coating having a coefficient of friction with human skin from about 1.01 to about 1.30 wherein said coating is adapted to reduce the risk of impact injuries, wherein said coating elongates proportionally to said core up to and including 450%, and wherein said coating avoids bending;
   said coating having one of a matting agent and anti-cut fibers;
   wherein said core is expanded polypropylene;
   said coating consisting of 2.5 parts Part A, 1 part Part B, and 1 part Part C;
   wherein Part A is 1,1'-methylenebis (4-isocyanatocyclohexane) and 2-n-Octyl-4-isothianzolin-3-one;
   wherein Part B is at least one zinc compound and n-butyl acetate;
   wherein Part C is a catalyst consisting of at least one acrylic polymer, at least one residual monomer, and water; and,
   wherein said device has a Gmax less than 200 and a HIC less than 1000.

5. A device for reducing impact injuries, consisting of:
   a rigid planar core of a slab shape with at least one surface, said at least one surface being skived, said core being expanded polypropylene of a density of at least 3.1 pcf and with a strain of about 0.1 MPa to about 0.4 MPa;
   a coating upon said at least one surface, said coating having a coefficient of friction with human skin from about 1.01 to about 1.30 wherein said coating is adapted to reduce the risk of impact injuries, wherein said coating elongates proportionally to said core up to and including 450%, and wherein said coating avoids bending;
   wherein said core is expanded polypropylene;
   said coating consisting of 2.5 parts Part A, 1 part Part B, and 1 part Part C;
   wherein Part A is 1,1'-methylenebis (4-isocyanatocyclohexane) and 2-n-Octyl-4-isothianzolin-3-one;
   wherein Part B is at least one zinc compound and n-butyl acetate;
   wherein Part C is a catalyst consisting of at least one acrylic polymer, at least one residual monomer, and water; and,
   wherein said device has a Gmax less than 200 and a HIC less than 1000.

* * * * *